(12) United States Patent  
Grapes

(10) Patent No.: US 6,446,130 B1  
(45) Date of Patent: Sep. 3, 2002

(54) MULTIMEDIA DELIVERY SYSTEM

(75) Inventor: James Roland Grapes, Cabins, WV (US)

(73) Assignee: Interactive Digital Systems, Keyser, WV (US)

( * ) Notice: Subject to any disclaimer, the term of this patent is extended or adjusted under 35 U.S.C. 154(b) by 0 days.

(21) Appl. No.: 09/268,976

(22) Filed: Mar. 16, 1999

(51) Int. Cl.$^7$ .............................................. G06F 13/00
(52) U.S. Cl. ...................... 709/231; 709/219; 709/329
(58) Field of Search ................................ 709/203, 219, 709/223, 225, 226, 229, 231, 232, 328, 329

(56) References Cited

U.S. PATENT DOCUMENTS

| | | | |
|---|---|---|---|
| 5,305,195 A | 4/1994 | Murphy | |
| 5,341,350 A | 8/1994 | Frank | |
| 5,481,509 A | 1/1996 | Knowles | |
| 5,778,187 A | 7/1998 | Monteiro | |
| 5,795,228 A | 8/1998 | Trumbull | |
| 5,809,512 A | 9/1998 | Kato | |
| 5,986,589 A | * 11/1999 | Rosefield et al. ............. | 341/61 |
| 6,018,765 A | * 1/2000 | Durana et al. .............. | 709/217 |

* cited by examiner

Primary Examiner—Viet D. Vu  
(74) Attorney, Agent, or Firm—Steptoe & Johnson PLLC

(57) ABSTRACT

A computerized multimedia delivery system designed to simultaneously display multiple streams of multimedia content is disclosed. The interactive delivery system is capable of (1) providing multiple streams of content to users of the system, (2) allowing users to interact with the system, (3) providing information concerning such users to a centralized computer for processing, (4) providing users with the ability to perform financial transactions, and (5) provide a printed receipt or redemption coupon. Content is digitally stored on a medium suitable for storage and retrieval by the computer system such as large capacity hard disk drives. The content to be displayed is selected either using a scheduling device or by user interaction. A user can interact with the system through a touch-screen graphical user interface on a video display. Once the content is selected, the system reads the configuration information for that particular content. The digital data representing the selected content is sent to a series of suitable digital to analog converters capable of converting the digital representation of the content into an analog signal which can be transferred to analog devices capable of audio and video reproduction. A device capable of financial transactions such as a magnetic stripe reader, smartcard reader, or currency validator is connected to the computer through input/output interfaces allowing the user to perform financial transactions through the system. An attached printer has the ability to provide the user with printed material related to the selected content. Two-way communication between the user and the system allows the system to collect user information directly related to specific content and transmit such information to a centralized data management center through a modem connected to the system. The system's multimedia content can be upgraded through an optical disk or data transmission by satellite.

40 Claims, 9 Drawing Sheets

FIG. 4

| 400 | 401 | 402 | 403 | 404 | 405 | 406 | 407 | 408 | 409 | 410 |
|---|---|---|---|---|---|---|---|---|---|---|
| ID No. | Title | Artist | Genre | Label | Media File name | Media File path | Media File Size | Graphic | Channel | Priority |
| Lighting Script | External Command Parameters | Source | No. of Plays | Last Played | Date Installed | Media File Type | Video Picture | Video Text | Audio Required | Promotional Event |
| 411 | 412 | 413 | 414 | 415 | 416 | 417 | 418 | 419 | 420 | 421 |

MULTIMEDIA DELIVERY SYSTEM

CROSS-REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

This invention relates generally to a multimedia delivery system, and more particularly to an interactive multimedia delivery system capable of (1) simultaneously providing multiple streams of multimedia content to users of the system, (2) allowing users to interact with the system, (3) providing information concerning users to a centralized computer for processing, (4) providing the user with the ability to perform financial transactions, and (5) providing a printed receipt or redemption coupon.

The ability of advertisers to effectively target specific audiences and obtain direct consumer feedback regarding the effectiveness of their advertising has never been totally satisfied. Traditional advertising has not (1) provided the intended audience with the ability to control the content of the advertising, (2) taken the form of high-quality multimedia presentations, (3) provided the audience with the ability to interact with the advertisement, and (4) provided the advertiser with direct information concerning the advertisers' audiences. Static billboard advertising provides none of these features. Although conventional television advertising allows the user to change channels and, therefore, provides the user with some ability to control the advertising content, such broadcasts do not provide a means for the audience to interact with the advertisement and do not directly provide advertisers with feedback concerning their advertisements. Although Internet advertising provides the audience with the ability to interact with an advertisement and can provide advertisers with feedback, such advertising cannot be in the form of high quality multimedia presentations.

These three forms of advertising also provide the advertiser with very limited control over targeting the audience that receives the advertisement. The ability for the advertiser to effectively target the advertisers' core audience would allow the advertiser to more effectively influence its audience.

Current methods of providing these benefits require advertisers to use expensive and elaborate two-way cable systems. Using cable systems, advertisers can broadcast advertisements and other promotional material to large diversified audiences. There are several disadvantages with such a system. First, these cable systems provide consumers with only limited ability to interact with the system and, correspondingly, provide advertisers with only limited data gathering capabilities concerning their audiences. Second, these systems provide the audience and the advertiser with only limited ability to dynamically schedule the content to be presented through the system. Third, because advertisers broadcast material to large diversified audiences, they are constrained to produce content that is suitable to present to such diverse audiences. Fourth, these cable systems do not provide advertisers with quick and accurate means to measure the effectiveness and appeal of their advertisements. Fifth, advertisers are limited in the types of additional promotional material that they can provide to interested potential consumers.

Various inventions disclosed in the prior art describe delivery systems but do not relate to advertising and do not disclose the improvements of the current invention. Such inventions generally relate to the field of jukeboxes. For example, the invention disclosed in U.S. Pat. No. 5,781,889, issued to Martin et al. for a Computer Jukebox and Jukebox Network, discloses a system including one or more computer jukeboxes that can be managed from a remote location. Unlike the present invention, the invention disclosed in Martin (1) does not provide for the simultaneous transmission of multiple streams of content, (2) does not store the multimedia content locally but rather depends on the host computer where the content is stored, (3) relates to audio transmission rather than a multimedia delivery system and, therefore, does not include the features of the present invention related to non-audio multimedia transfers and presentations such as the ability to simultaneous transfer multiple video content streams, (4) does not utilize a touch-screen interface, (5) does not provide a means for transferring user information to a centralized data base management system for processing, and (6) does not provide a means for providing feedback to advertisers.

The invention disclosed in U.S. Pat. No. 5,481,509, issued to Knowles et al. for a Jukebox Entertainment System Including Removable Hard Drives, discloses a jukebox containing a plurality of hard disc drives, each containing digital audio/video data. Unlike the present invention, the Knowles system does not allow for the simultaneous delivery of a plurality of discrete content packages to users of the system. In addition, the Knowles system (1) discloses the exchange of removable hard disc drives to update the content rather than transferring the updated information using an optical disc drive or satellite link, (2) does not store the multimedia content locally but rather depends on a host computer where the content is stored, (3) does not include the ability to control external devices through infrared signals, (4) does not provide a means for transferring user information to a centralized data base management system for processing, and (5) does not provide a means for providing feedback to advertisers.

The invention disclosed in U.S. Pat. No. 5,341,350, issued to Frank et al. for a Coin Operated Jukebox Device Using Data Communication Network, discloses a coin-operated music playing jukebox, including, a payment unit, a display, an input keyboard, and at least one speaker. By way of a telecommunication line, the jukebox is connected with a central music store, which transmits audio information to the jukebox. Unlike the present invention, the Frank invention (1) involves only one simultaneous stream of content, (2), is connected to a central music store through a remote data transmission line, and (3) requires an Ethernet adapter to transfer the information through the system.

Accordingly, there is therefore a need for an inexpensive system, capable of presenting high quality dynamically scheduled multimedia promotional material specifically suited to a targeted audience, wherein such a system provides direct consumer feedback to the advertiser. In addition, there is a need for a system that can provide additional promotional materials, such as purchasing incentives, to the system's audience.

BRIEF SUMMARY OF THE INVENTION

This invention discloses a computerized interactive multimedia delivery system capable of simultaneously delivering a plurality of discrete streams of multimedia content. The system allows the user of the system to interact with the system. The system is capable of providing information concerning the user of the system to a centralized computer for processing. The disclosed multimedia delivery system may be used for various purposes including entertainment, advertisement and promotion, information exchange, or any other use desired by the operator of the system.

The disclosed system includes a computer. The computer contains one or more hard disk drives, to store the multimedia content to be presented to the user of the system, and the necessary computer programs and associated files used to operate the system.

The system also includes external equipment, which can either be provided to the operator along with the computer system or can be pre-existing equipment that can be adapted to present the multimedia content from the system. The external equipment can be controlled and managed by the system computer, using an infrared sensor located on each piece of external equipment. Such external equipment can include electronic display equipment, such as video or television monitors, an aesthetic lighting display, audio amplifiers, speakers, and any other equipment capable receiving control instructions and multimedia content. The content can be transferred to the external equipment through a video/audio cable or an R/F cable carrying an R/F modulated composite audio and video signal.

The content is transferred from the computer to the external equipment through a series of converters. These converters first decode the multimedia content, if necessary, and then convert the decoded multimedia content from digital to analog format. The converters transmit the discrete left, right, and video signals to either the final display devices or transmit these signals to RF modulators, which combine the three signals into a single RF modulated signal suitable for reception by conventional television tuners. The converters, combined with the RF modulators, provide the capability of simultaneously providing multiple content streams on a single RF cable.

The system can also include a printer that may be used to deliver to the user physical output from the system. Such physical output can include promotional materials that can be used to further enhance the marketing of an advertiser's product or services. The printed physical output may be predefined or may be dynamically generated according to the user's request and may have a watermark or bar code for identification and verification purposes.

The user of the multimedia delivery system can interact with the system via a touchscreen user interface. The touch sensitive video interface graphically and textually defines specific areas of the display. Additional user input can be provided by a virtual keyboard, which graphically and functionally simulates a conventional computer keyboard on a touch sensitive display.

The system also allows the user to purchase products directly through the system. The system may include a card reader, capable of secure credit or debit card transactions. The system may also include a currency validator to allow the user to make cash transactions, thereby enhancing the systems point-of-view purchasing capabilities. Such point-of-view purchasing capabilities allows the system to offer an advertiser even greater ability to interact with the user, as the advertiser can offer incentives tailored to impulse purchases or gather consumer information.

Multimedia content is transferred through the system to the user in the form of content packages consisting of any combination of audio, video, text, and still or animated graphics. Each content package contains the information required to process and display the multimedia content, including the required file names, the scheduling of the content to be displayed, the identity of the specific channel to be used to transfer the content, the content itself, any printed material associated with the content, and the associated information used to further describe the intended functioning of the content. The system processes the content packages in an order defined by a set schedule or in an order dynamically determined by a user. Each content package also contains action properties that describe the desired actions associated with the content.

The system can update the content packages contained on the storage devices using an optical disk drive, a satellite receiver, or a combination of both. The upgrade process can be performed either automatically or may be customized by the local system administrator. The upgrade process can consist of removing existing content packages contained on the storage devices and adding new content packages.

The system can contain a modem which can (1) provide information about users to a central database, (2) notify the system administrator of any problem with the system, and (3) facilitate financial transactions. In addition, an Ethernet card can be used to expand the user interface to additional areas of the local environment.

Other objects, features, and advantages of the present invention are apparent from the following description of certain preferred embodiments of the invention taken in conjunction with the accompanying drawings, although variations and modifications may be effected without departing from the spirit and scope of the disclosure.

BRIEF DESCRIPTION OF THE DRAWING

FIG. 4 illustrates of the data structure of an individual content package of the present invention.

DETAILED DESCRIPTION OF THE PREFERRED EMBODIMENT

Figure 1A:
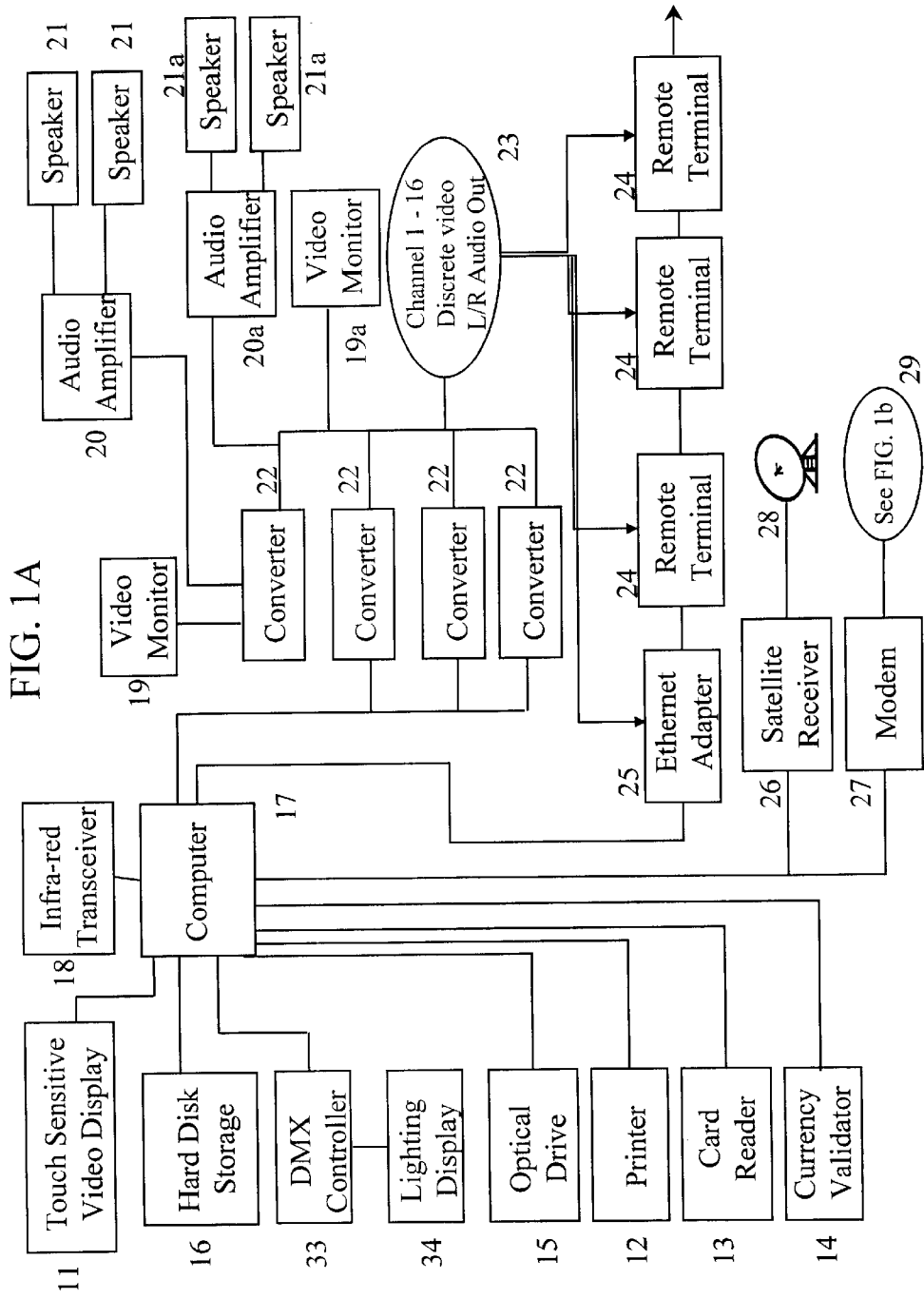
FIG. 1a is a block diagram of the computerized multimedia delivery system of the present invention.

Referring to FIG. 1a, the computerized multimedia delivery system of the present invention contains a computer 17. In the preferred embodiment of this invention, the computer 17 is an Intel platform based Pentium PC. The computer 17 is the central processing unit of the multimedia delivery system and is controlled by a computer program designed to instruct the computer 17 how to perform the data processing and task management operations. The computer 17 is connected to various hardware devices.

A storage device 16, such as a hard disk storage device, is connected to the computer 17 by way of an industry standard interface. The storage device 16 contains the computer program, the operating system for the computer system, the database of multimedia content, and the necessary files to process and deliver the content.

An optical drive 15, capable of reading CD-ROM or DVD-ROM media, is connected to the 17 computer through a standard interface and allows the system to easily and rapidly transfer large amounts of data to the storage device 16 under the control of the computer's content management system. This optical drive 15 is primarily used to upgrade the multimedia content on the system. The optical drive 15 may also be used as auxiliary storage, independently storing additional multimedia content.

The multimedia delivery system may also include a satellite receiving station, consisting of a satellite dish 28 and a satellite receiver 26, connected to the computer 17. This satellite receiving station can also facilitate high-speed data transfers to the storage device 16. Data can first be transferred or "uplinked" to a geo-stationary satellite from a centralized server containing the data to be transferred. The data can then be transferred or "downlinked" from the geo-stationary satellite to each individual multimedia delivery system through the satellite receiving station. The satellite dish 28 facilitates the data transfer from the geo-stationary satellite to the satellite receiver 26. From the satellite receiver 26, the data can be transferred to the hard disc storage device 16. This type of data transfer can also be to used to update the multimedia content on the hard disk storage device 16. The satellite dish 28 and the satellite receiver 26, used in the preferred embodiment of the present invention, is the Hughes DirecPC.

Each multimedia presentation file may contain various types of data including the content to be presented to a user through various media, such as video and audio transmissions. Examples of such content include music video presentations and commercial advertisements. Video content can be displayed on a video monitor 19 and audio content can be presented through an audio amplifier 20 and associated speakers 21. To display video content on a video display monitor 19, the digital data, which is stored on the hard drive 16, must be converted into analog format. In addition, if the video content is accompanied by audio content, the audio content must be reproduced in a suitable audio amplifier 20.

The video and audio content is converted by means of a series of converters 22 which decompress or otherwise processes the digital audio and video content and convert the digital data to analog signals which can be used by conventional reproduction equipment including a video monitor 19 to display the video content, and the audio amplifier 20 and associated speakers 21 to transmit the audio content.

Each converter 22 in the preferred embodiment contains four separate microprocessors. Accordingly, each converter can convert four multimedia streams simultaneously. In the preferred embodiment of the invention, as illustrated in FIG. 1a, four converters 22 are incorporated into the system. In this embodiment, the independent multi-stream channel capacity is increased to sixteen—four converters each capable of presenting four simultaneous multimedia streams of content. Accordingly, the system can present sixteen streams of multimedia simultaneously, with each channel or stream capable of delivering high quality NTSC/PAL composite video and discrete stereo sound. If multiple groups of external devises are used to present the multimedia content, discrete streams of content can be sent to each individual group of external devices. For example, if two video monitors 19 are incorporate into the system, two separate streams of content can be sent to each of the two video monitors 19 simultaneously, allowing each video monitor to present different content at the same time—one content stream can be presented through the video monitor 19, the audio amplifier 20 and the speakers 21 while a second content stream can be presented through a second set of external equipment, video monitor 19a, audio amplifier 20a and speakers 21a. The converter 22 used in the preferred embodiment of the present invention is the 4-ReelTime Pro by Visual Circuits. This converter 22 further has the ability to display overlaid onscreen graphics that can be superimposed on the video display 19.

Figure 2:
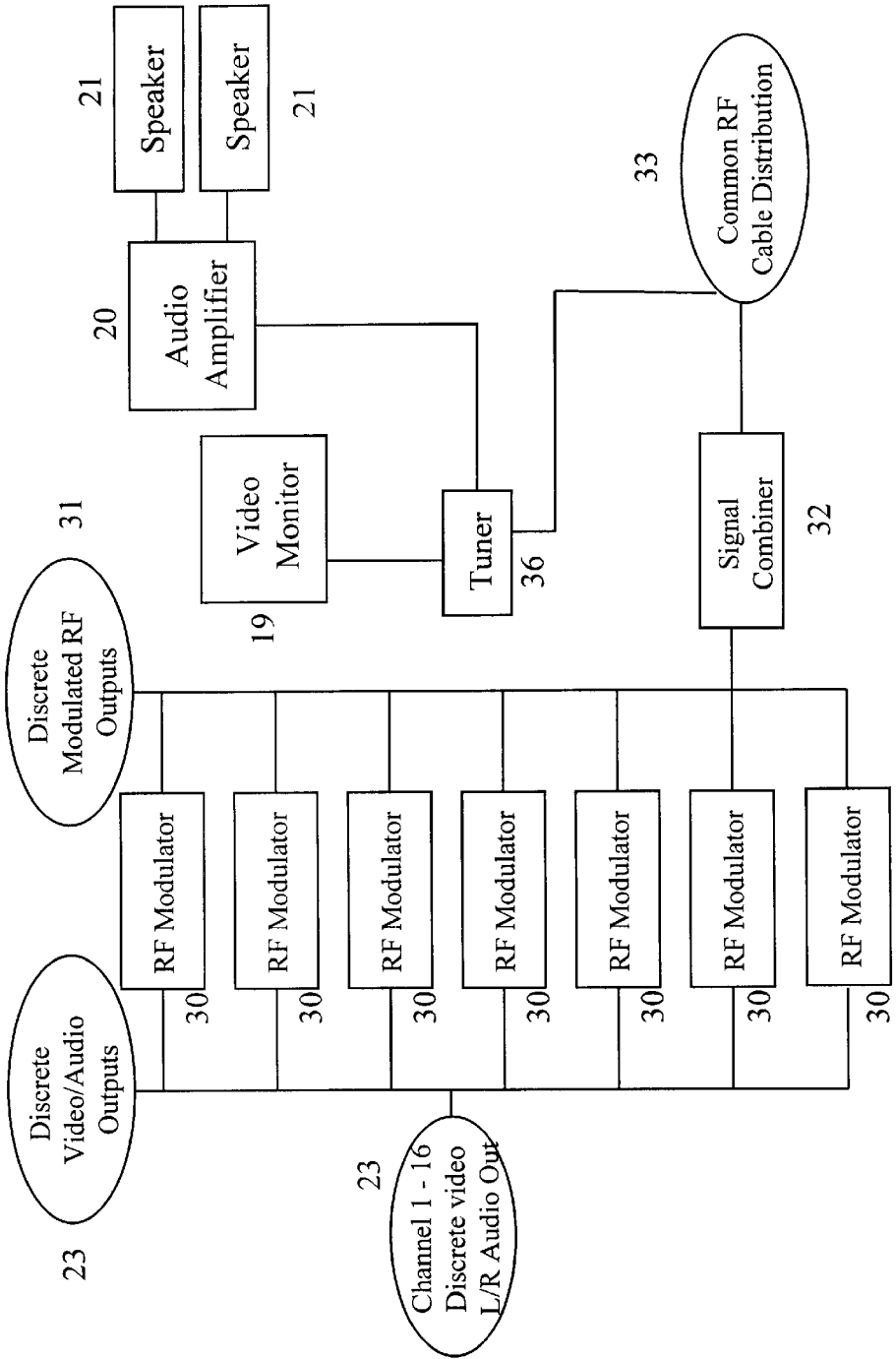
FIG. 2 is a block diagram of the process of converting discrete video, left audio, and right audio signals into a modulated RF signal.

Referring to FIG. 2, the output signal 23 of each converter 22 is comprised of discrete composite video, left audio, and right audio signals for each channel in the multimedia delivery system. The output signals 23 may be utilized in this format through an appropriate connection between the system and the appropriate external devices such as the video monitor 19 and the audio amplifier 20 and speakers 21. Alternatively, the discrete output signals 23 may be further converted, using an RF modulator 30, into a single RF modulated signal that can be transferred to conventional television receivers. Each RF modulator 30 may convert the discrete signals into a different RF frequency, allowing the RF signals to be combined using a signal combiner 32. This approach permits the system to distribute multiple analog channels over a single RF coaxial cable and allows a video monitor 19, equipped with a standard television tuner 36, to select any of the simultaneously distributed multiple analog channels being transmitted to the video monitor 19 by tuning the video monitor to a particular frequency on the tuner 36. The content can then be presented to a user through the video monitor 19, the audio amplifier 20 and the speakers 21.

A user can interact with the multimedia delivery system using a touch sensitive video display 11, such as the Micro-Touch Capacitive sensor, and a controller connected to the computer 17 by a serial interface. Predetermined sections of the video display 11 are designated by the computer program to respond to user touch. By touching such predetermined sections of the video display 11, the user provides information to the computer 17. The intended function of each touch sensitive section on the video display 11 is presented to the user of the system either graphically, textually, or both. This presentation is know as the graphical user interface.

For example, the user of the system may:

(1) request that the system deliver specific multimedia content, (2) interact with promotional advertising delivered through the system, (3) make purchases or engage in other financial transactions through the system, or (4) provide consumer specific information, such as demographic data, that can be compiled into databases.

In the preferred embodiment, the default display presents to the user a sampling of the multimedia content stored on the system. The system may incorporate substantially more interaction options than can be effectively represented on a single screen of the video display 11 at one time.

Accordingly, the system and the computer program operating the system can allow the user to view multiple screens, either by paging or scrolling through the available interaction options. In the preferred embodiment, the default screen also displays advertising icons or graphical representations of a particular promotion.

Various other screen interfaces can be used to process different user inputs. For example, a user can provide information to the system through a "virtual keyboard," which is a graphical representation of the alphanumeric characters of a conventional computer keyboard on the touchscreen video display 11.

Figure 1B:
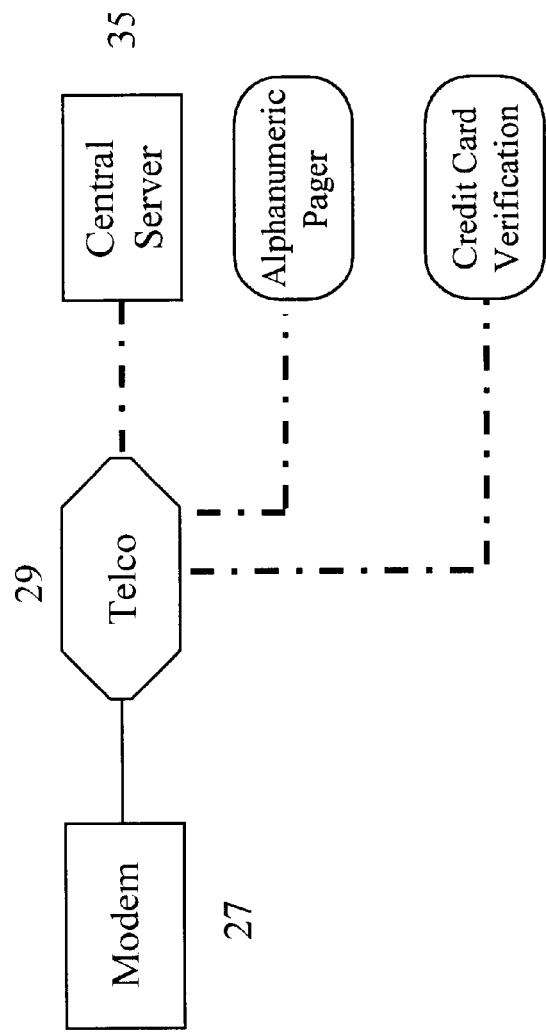
FIG. 1b is a block diagram of the modem communications of the present invention.
Figure 1C:
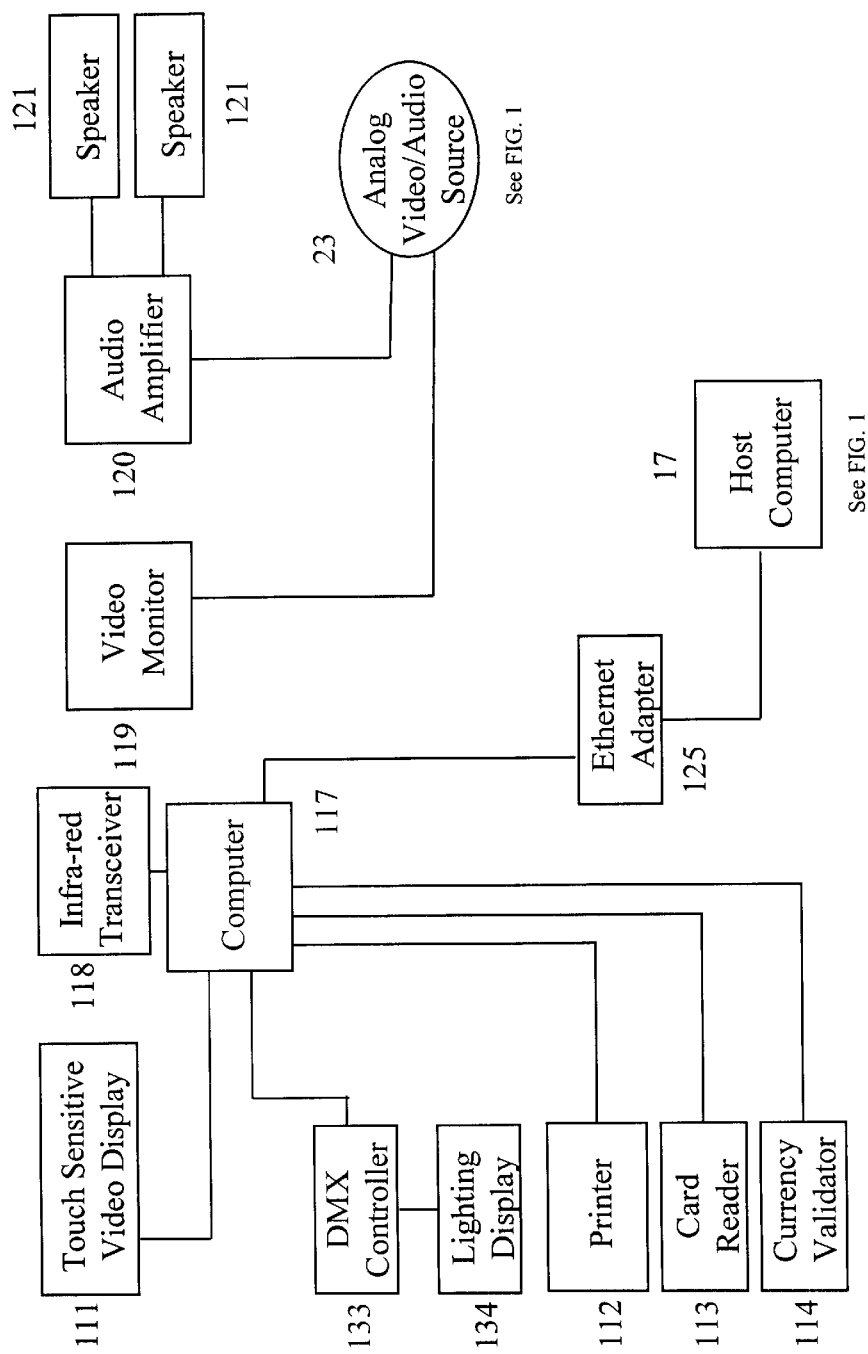
FIG. 1c is a block diagram of the remote terminal of the present invention.

A card reader 13 allows the user to perform credit card and debit card financial transactions, further enhancing the system's interaction with the user. The card reader 13 may process magnetic stripe cards or smartcards by reading the necessary card information and notifying the computer 17 as to the contents of the cards. The computer can then further process the transaction by communicating with the credit card company or other financial institution through an attached modem 27, as illustrated in FIG. 1b.

A user can also perform financial transactions using the multimedia delivery system through a currency validator 14 which is connected to the computer 17 and is suitable for facilitating unattended cash transactions. The currency validator 14 can be connected to the computer 17 through one of two methods, depending on the specific model of currency validator 14 being used. The ability of the system to incorporate these two methods, each with different connection protocols, provides the system with hardware flexibility. The system can determine the specific method to use by determining the validator's operation profile defined in the system configuration.

Method 1: The first method of connecting the currency validator 14 to the computer 17, the preferred embodiment, uses a standard serial interface connection. This connection uses a bi-directional serial data transfer to transfer information between the currency validator 14 and the computer 17 and provides for detailed data exchange between the computer 17 and the currency validator 14. The bi-directional communication between the computer 17 and the currency validator 14 provides the system with the ability to control of the validator 14. Such control includes (1) the control of the configuration settings for the currency validator 14, and (2) the ability to transfer detailed information concerning the status of the currency validator 14 and currency value inserted into the currency validator 14 to the computer 17. Such bi-directional communication allows the system to record the currency denominations presented by the users of the system and alert the system administrator to the possible causes of problems. An example of a currency validator 14 that is capable of using this first method is the Cash Code Amazing 1100.

Method 2: Method 2 also uses a standard serial interface to connect the currency validator 14 to the computer 17. This method, however, uses isolated pulses, transmitted from the interface of the currency validator 14, to communicate with the computer 17. The currency validator's output changes the state on the serial line connecting the currency validator 14 with the computer 17, such that the number of pulses directly corresponds to the value of the currency inserted into the currency validator 14. For example, four pulses sent from the currency validator 14 across the serial line could translate to a single dollar. A specific software algorithm contained in a computer program running on the computer 17 decodes the incoming pulses and provides the system with the correct currency value without further hardware conversion or decoding. Unlike method 1, this method does not provide for bi-directional communication between the currency validator 14 and the computer 17.

The system can include a printer 12 attached to the computer 17, capable of providing the user with physical "hard-copy" output without complicated paper handling by incorporating a built in cutter and presenter. These features are important because they allow the system to effectively operate without the system administrator attending to the operation of the system. The printed material can take the form promotional material that an advertiser can use to further market its products.

In addition, the printer 12 may be used to provide the local administrator with printed information concerning the operating status of the system as well as historical reports regarding user interaction and transaction history. The system is capable of bi-directional communication between the computer 17 and the printer 12, allowing the printer 12 to report various conditions about the status of printer 12 to the system. For example, the printer 12 can alert the computer 17 that the printer 12 has a low paper condition. The multimedia delivery system could then notify the system administrator of the low paper condition so that the proper maintenance procedure can be scheduled.

An infrared encoder and transceiver 18 can be connected to the computer 17 to provide the system with the ability to conduct wireless infrared communications. Such wireless communications can be between either (1) the computer and the external equipment controlled by the system, or (2) a remote control and the system.

This method of data exchange can be used to send control commands from the computer 17 to external equipment, such as the video monitor 19 and the audio amplifier 20 and speakers 21. Bi-directional wireless communication between the system and such equipment allows the system to control the equipment. Remote commands can be incorporated into and defined in each individual package of multimedia content, providing the system with the maximum flexibility to control the presentation environment for each individual piece of multimedia content.

The control code for communicating between the system and the external equipment can be generated by the system as defined by the properties of the multimedia content. Each piece of external equipment is predefined in the system configuration, identifying the proper IR (infrared) code for that particular piece of equipment. Upon receiving an instruction to control a piece of external equipment, the system sends the proper sequence of commands to a pre-programmed universal remote control device. This device decodes the instruction and converts it into an infrared light transmission, encoded in a format suitable to be received and translated by the particular equipment. This wireless communication can be used to turn stereo receivers or television monitors on or off, or change operational states according to the specifications described in each particular multimedia content package.

In addition to allowing the system to control external equipment, the transceiver 18 also allows the system to send and receive serial data to or from a portable device capable of generating or receiving data compatible with the system, thereby allowing a user of the system to control the system using wireless communication. For example, using a remote control, a user could cancel a current selection. In addition, such a remote could constitute a portable data collection device to collect specific information regarding the user input and display information.

A modem 27, suitable for communicating over a local standard telephone connection 29, can also be attached to the system. As illustrated in FIG. 1b, The modem can serve several functions. First, information input into the system by users of the system can be transferred from the modem 27 through a standard telephone line 29 to a central database contained on a central server 35 for collection and processing. Such information can be transferred at predetermined regular intervals or can be scheduled by the system administrator. Such information can include the date and time that multimedia content was presented, purchases made by users, coupons presented to users, money inserted into the card reader 13, credit card transactions, user interactivity, content upgrades, and advertising displays with the corresponding time and date information. This information may be used to provide advertisers and content providers with more location specific information. Second, administrative operations required for the system to effectively operate can be implemented through the modem 27. For example, the system can continuously monitor the status of the hardware connected to the system and report any system problems to the designated trouble contact using the modem 27. The modem can either send a signal to the contact's computer or alphanumerically page the contact (Alphanumeric Pager). Diagnostic and trouble history information can also be communicated to the system server to report problems and the condition of the system. Third, the modem 27 can be used to facilitate credit card validations. The system may communicate with financial validating service, through the modem 27, to validate a user's credit card, allowing the user to perform financial transactions through the system (Credit Card Verification).

The multimedia delivery system also includes provisions for optional remote terminals 24, positioned relatively local to the principal system, to further expand the ability of the user to interact with the system and to further implement the multi-channel capabilities 23 of the system. As a result of the multi-channel capabilities, the remote terminal 24 can function identical to the principal terminal without requiring certain expensive components. These remote terminals 24 can be connected to the computer 17 by means of an Ethernet adapter 25 through a standard network protocol or other means conforming to LAN standards. Each remote terminal consists of a touch sensitive display 111 connected to a local computer 117, which controls the operation of the remote terminal. The remote terminal 24 functions similar to the principal system with the differences being (1) a remote terminal does not need a content storage device 16, and (2) a remote terminal does not need the converters 22, RF modulators 30, or signal combiners 32 to translate the digital representations of the multimedia content into multiple streams of analog content. The principal system stores, processes, and transmits the multiple analog streams of multimedia content simultaneously from the host computer 17 to the remote terminal 24. The content is transferred through standard analog transmissions such as composite video and discrete audio or by RF cable to reproduction equipment located in close proximity to the remote terminal 24 on the channel specified by the remote terminal 24. Similarly to the functioning of the host system, the analog video and audio multimedia sources can be presented to the user through a video monitor 119, an audio amplifier 120 and speakers 121. The remote terminal 24 may also include a currency validator 114, a card reader 113, and printer 112, a DMX controller 133, a lighting display 134, and an infrared transceiver 118 that function in the same manner as their corresponding components associated with the host system.

As illustrated in FIG. 4, information concerning the multimedia content and its associated properties are stored on the hard disc storage device 16 in the form of content packages. These content packages, or database records, contain fields or properties that define or describe each particular multimedia content to be presented as well as the contents of the media event.

The content database file contains a series of records, each representing a particular content package. Information in the record provides the computer program with all of the data necessary for the properly delivering the multimedia content to the user. Each content package contains information about the multimedia content to be delivered in the following fields: a) an identification number field, 400, containing the identification number for the multimedia content; b) a title field, 401, containing the name of the multimedia content; c) an artist field, 402, containing the name of the artist associated with the multimedia content; d) a genre field, 403, containing the type of multimedia content, i.e., rock, country, rap, classical, etc.; e) a label field, 404, containing information about the distributor of the multimedia content; f) a media file name field, 405, containing the actual computer file name of the multimedia content file located on the storage device 16; g) a media file path field, 406, containing the location of the multimedia file on the storage device 16; h) a media file size field, 407, containing the size of the multimedia file; i) a graphic field, 408, identifying the name and path of any graphic file associated with the multimedia content; j) a channel path field, 409, identifying the selected channel through which the multimedia content is to be delivered; k) a priority field, 410, containing information concerning whether the multimedia content has priority over other content to be distributed; l) a lighting script file field, 411, containing a file representing the digital representation of the commands to control a lighting display if a lighting display is associated with the multimedia content; m) an external command parameters field, 412, containing the commands to control the external devices such as the video monitors 19 and 19a, and the audio amplifiers 20 and 20a; n) a source field, 413, containing the source of the content; o) a number of plays field, 414, containing the number of times that the multimedia content has be presented to a user; p) a last played field, 415, containing the date and time that of the last time the multimedia content was presented to a user; q) a date installed field, 416, containing the date and time that the multimedia content was installed on the storage device 16; r) a media type field, 417, identifying the type of multimedia content file; s) a video picture field, 418, identifying whether a video graphic picture is associated with the multimedia content; t) a video text field, 419, containing information concerning any text associated with the multimedia content; u) an audio required field, 420, identifying whether the multimedia content has an audio component; and v) a promotional event field, 421, identifying whether any promotional or purchase opportunities are associated with the multimedia content.

Upon processing a particular content package, the computer program firsts reads the contents of the records and determines the actions that need to be performed. The computer program determines which media channel the content package is associated with and locates the specific media file as referenced in the package. A user of a remote terminal 24 may request that the channel be altered so that the content may be displayed to the proper reproduction devices located within close proximity to the remote terminal 24.

The computer program contains a separate set of instructions, specifically designed to process these file-handling operations by receiving file information from the content package, and coordinating the data transfer to dedicated hardware contained on the converter 22. After the conversion process, the resulting video and audio information is directed to the analog media outputs of the system to be directed to the respective video and/or audio reproduction equipment such as the video monitor 19 and audio amplifier 20.

FIGS. 3a, 3b, 3c and 3d illustrate the detailed operation of the system.

Figure 3A:
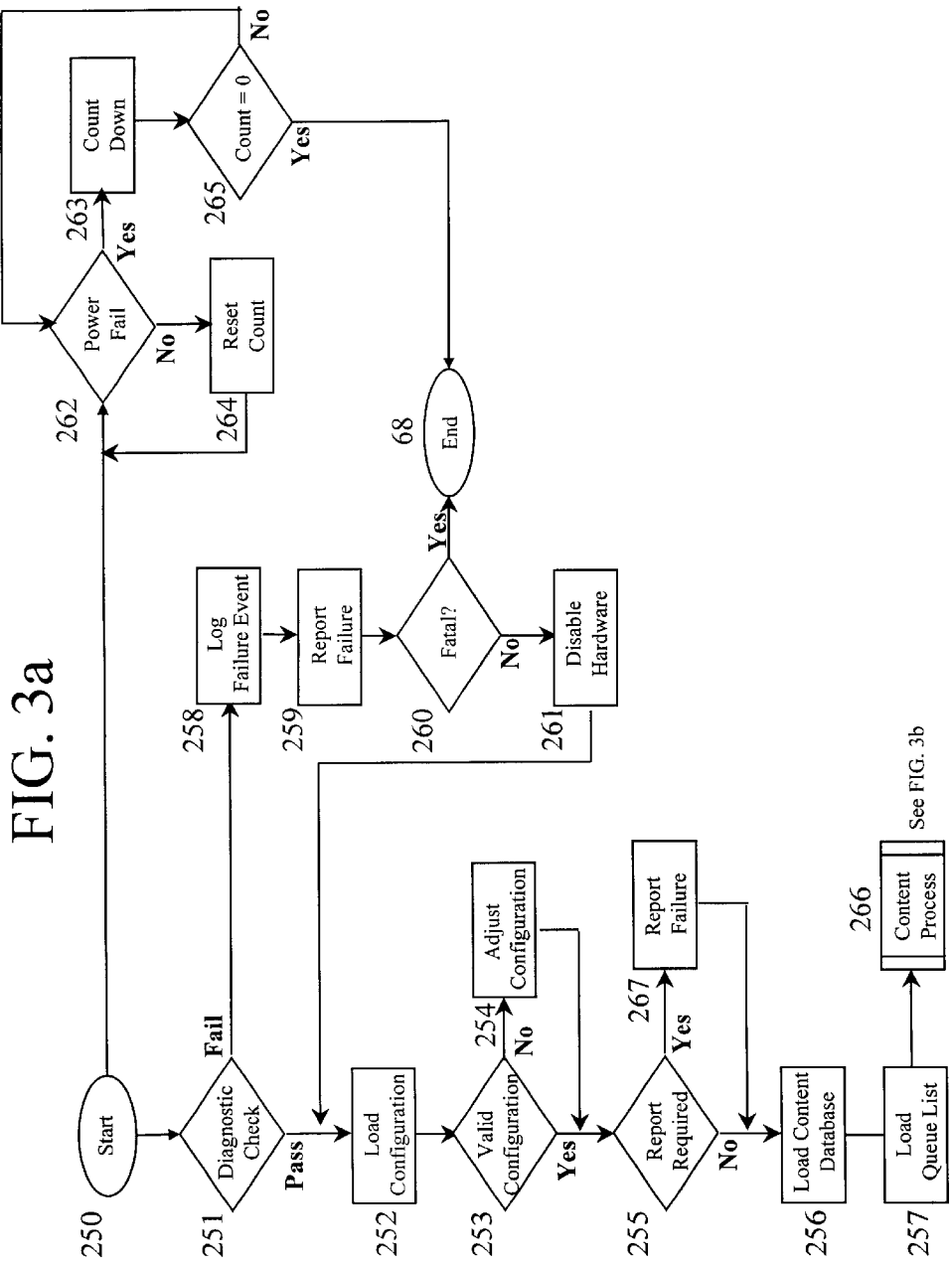
FIG. 3a is a flow-chart illustrating the initialization procedure of the computerized multimedia delivery system of the present invention.

FIG. 3a illustrates the initialization procedure for the multimedia delivery system. When the system is turned on 250 (Start), the computer program instructs the computer 17 to test all of the connected hardware, such as the printer 12, card reader 13, and currency validator 14, and determines whether the system is operating properly 251 (Diagnostic Check). If the computer program detects a device failure, the computer program logs the failure into a database 258 (Log Failure Event). The system then notifies the system administrator of the problem 259 (Report Failure). Such notification can take the form of an alphanumeric page, communicated to the administrator through the modem 27, or an error report printed on the printer 12. The system can also notify the central computer database of the device failure by communicating with the central computer database through the modem 27.

The system determines whether the device failure is fatal to operating the system 260 (Fatal?). If the device failure is critical to operating the system, the program will automatically shut the system down 68 (End). If the device failure is not critical to operating the system, the failure is recorded and the system administrator is alerted to the problem through the methods described above. The computer program will temporarily eliminate any functions relating to the failing device, until the problem with the device is corrected 261 (Disable Hardware). For example, if the computer program determines that the printer 12 failed to respond to a diagnostic command, the program will disable all printer operations, alert the administrator of the details of the failure, and continue operating the system without the use of the printer 12.

Next, the computer program loads the configuration database and reads the preferences for the system as specified by the system administrator 252 (Load Configuration). The information in the configuration database contains data fields describing the properties of the unique system configuration, such as the hardware devices connected to the system—the card reader 13, the currency validator 14. and the optical drive 15. Information included in this database details specific desired operations such as the default media channel and the network status of the system.

After reading this information, the computer program verifies the hardware configurations as defined by the configuration table 253 (Valid Configuration). If the hardware configuration does not conform to the actual hardware being used by the system, the system alters the particular hardware profiles to accurately portray the actual hardware configuration 254 (Adjust Configuration).

The system then determines whether any altered hardware profiles are to be reported to the system administrator 255 (Report Required). If such a report is required, the system notifies the system administrator of the problem 267 (Report Failure). As described above, such notification can take the form of an alphanumeric page communicated to the administrator through the modem 27, an error report printed on the printer 12, or a message to the central server 35 through the modem 27.

The program then transfers the content packages from the hard disc storage 16 into the RAM of the computer 17; 256 (Load Content Database). An additional separate database, consisting of the content packages which have been either predetermined or selected by the user of the system (as described above) to be presented to the user, is also transferred from the hard disc storage 16 into the RAM of the computer 17; 257 (Load Queue List). These selected content packages are organized into a set of records to be executed in order—the queue list that defines the order in which each content package is to be processed by the system. The computer program can use the queue list to process the content packages automatically in a predefined order.

The computer program, beginning with the first content package in the queue, reads the identity of the content package and processes it. The display order can be dynamically altered the user. If, for example, a user requests the presentation of a particular content package, that content package can be inserted next in line in the queue to be presented at the next opportunity. Since the system has multi-channel capability, the content package contains information identifying which media channel to display the multimedia content associated with the package. This channel information may be altered if the request is made from a remote terminal 24, so that the content may be displayed to the proper reproduction devices located within close proximity to the requesting remote terminal 24. In the preferred embodiment, the primary presentations take place on a default channel as defined in the configuration database. An individual default channel is associated with each remote terminal 24. After the queue list is processes, the system processes the multimedia content as illustrated in FIG. 3b; 266 (Content Process).

The power to the system is continuously monitored while the system is operating. If the power is appropriately being delivered to the system 262 (Power Fail), the system continues to operate and the timer or count is reset to check the system again at the predetermined interval 264 (Reset Count). If the power is not appropriately being delivered to the system, the system implements a count down procedure (Count Down). If, at the end of a period of time 265 (Count=0), the power has not been restored to the system, the computer program will automatically shut the system down 68 (End). If the power is restored to the system before the predetermined time period elapses, the power check process begins again. This process is continuously repeated while the system is operating.

Figure 3B:
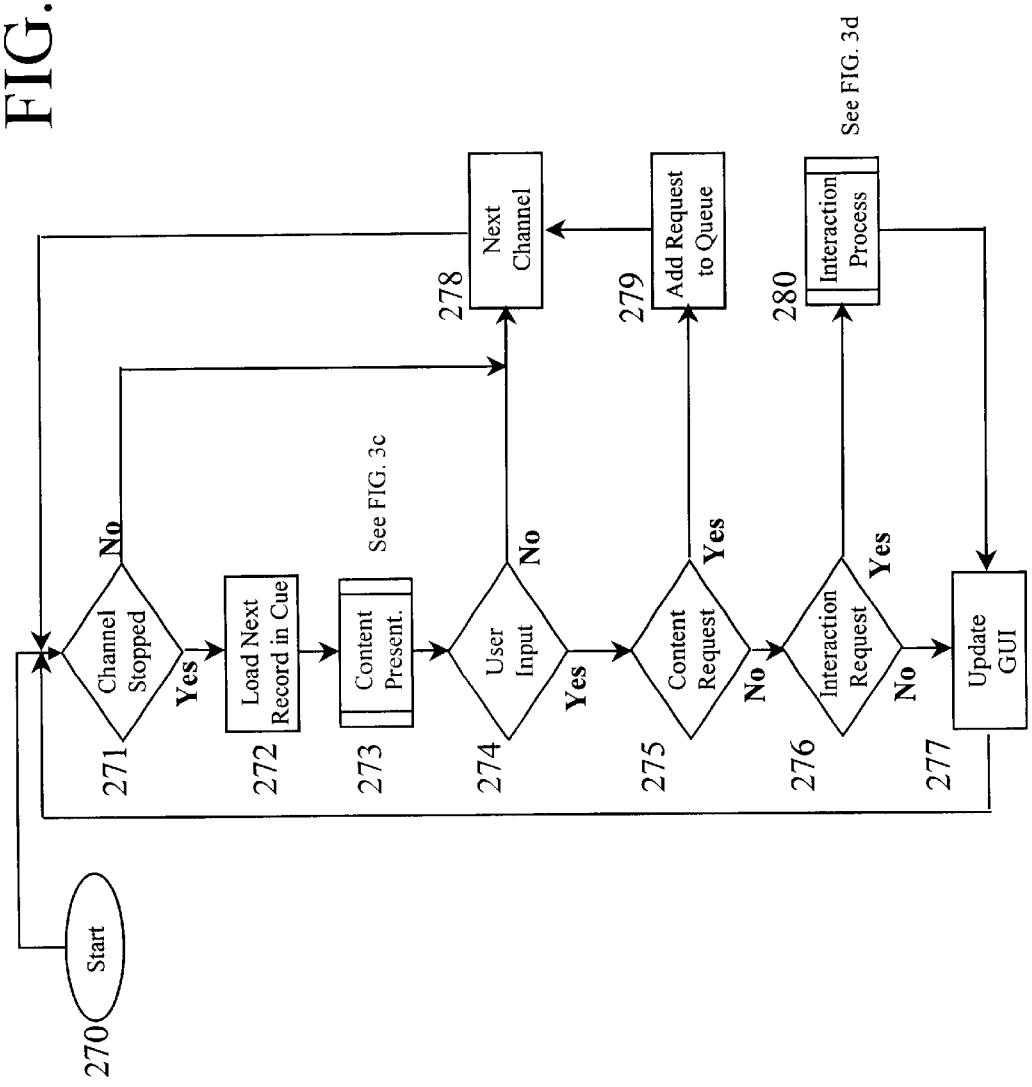
FIG. 3b is a flow-chart illustrating the flow of content through the computerized multimedia delivery system of the present invention.

FIG. 3b illustrates the processing of the multimedia content through the system and the associated user interaction with the system. After the computer program has implemented the initialization procedure 270 (Start), the system processes the content as illustrated in FIG. 3b. The system first determines whether a transmission is currently being transferred through a given channel or whether the channel is not being utilized 271 (Channel Stopped). If the system is already transferring data through a channel, the system advances to the next channel 278 (Next Channel) and the process is repeated for the new channel. Once the system determines that a particular channel is not being used, the computer system processes the next content package in the queue 272 (Load Next Record in Queue). Once the system is prepared to present the next content package in the queue, the system follows the procedures illustrated in FIG. 3b as described below 273 (Display Content).

The system determines whether a user of the system communicated with the system, either through the graphical user interface on the touch sensitive video display 11 or the remote control 274 (User Input). If the user has not interacted with the system, the system advances to the next channel and repeats the procedures associated with evaluating the status of the channel as described above 278 (Next Channel). If the user has interacted with the system and has requested a particular multimedia content to be presented 275 (Content Request), the particular content package associated with the selected multimedia content is inserted into the queue list 279 (Add User Request to Cue). The system then advances to the next channel and repeats the procedures associated with evaluating the status of the channel as described above 278 (Next Channel).

The system evaluates whether the user has requested to interact with the system 286 (Interaction Request). If the user has requested to interact with the system, the computer program implements the interaction process, as illustrated in FIG. 3d, 280 (Interaction Process). If the user has not requested to interact with the system, the display on the touch sensitive video display is revised to incorporate the completed content process procedure 277 (Update GUI—graphical user interface).

Figure 3C:
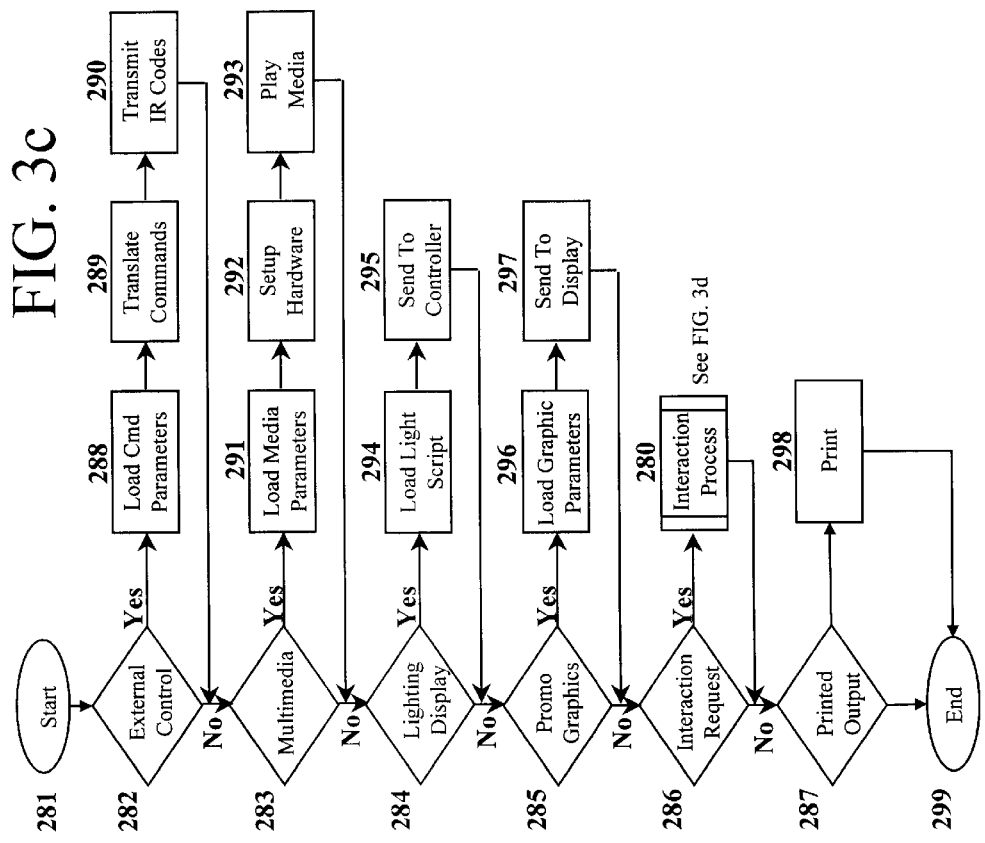
FIG. 3c is a flow-chart illustrating the presentation of the multimedia content through the computerized multimedia delivery system of the present invention.
Figure 3D:
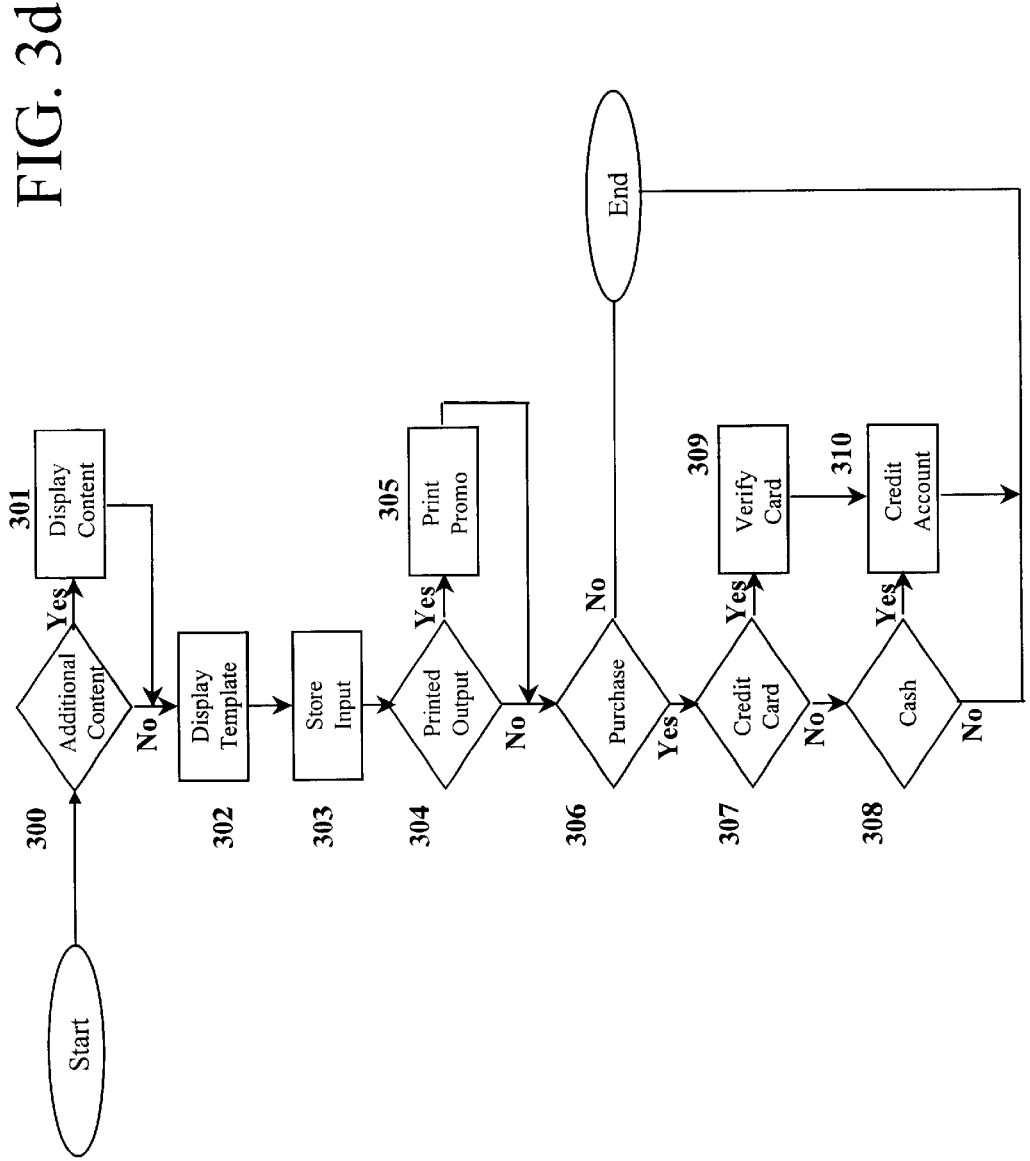
FIG. 3d is a flow-chart illustrating the user interaction with the computerized multimedia delivery system of the present invention.

FIG. 3c illustrates the presentation of multimedia content using the multimedia delivery system of the present invention. The multimedia delivery system determines whether the system needs to control any of the external devices, such as the video monitor 19, the audio amplifier 20 and associated speakers 21, using the infrared transceiver 18; 282 (External Control). If the external control is required, the system transfers the command parameters from the database stored on the hard disk storage unit 16 into the RAM of the computer 17; 288 (Load Cmd Parameters). For example, such command parameters could include commands to turn a television on or to turn the television monitor and turner to an auxiliary channel. The computer program associated with the computer 17 then translates the desired action into the proper infrared (IR) codes, using translation tables associated with each individual piece of external equipment 289 (Translate Commands). The system then transmits the IR codes from the computer, using the infrared transceiver 18, to the receiver built into the selected external equipment to be controlled 290 (Transmit IR Codes). The external device then responds to the command, allowing the multimedia presentation to properly be presented using such device.

The multimedia delivery system determines whether multimedia, consisting of video and sound, is to be presented to the user 283 (Multimedia). If multimedia content is to be presented, the system transfers the media parameters from the database stored on the hard disk storage unit 16 into the RAM of the computer 17, 291 (Load Media Parameters). For example, such media parameters could include the selected channel to present the multimedia presentation, whether audio is associated with the particular presentation, whether a static graphic image is associated with the presentation, and any other information contained in the content package as illustrated in FIG. 4. The converter 22 is then configured to implement the loaded parameters, such that when the digital data relating to the multimedia content is decoded by the converter 22, the parameters are incorporated into the multimedia presentation to be delivered 292 (Setup Hardware). The configured stream of multimedia content is then transferred through the system to the appropriate external equipment to present the content, such as the video monitor 19 and the audio amplifier 20 and associated speakers 19, either through discrete left, right, and audio signals, or through an RF signal 293 (Play Media).

The multimedia delivery system determines whether a lighting display, associated with the content to be delivered, is to be presented to the user 284 (Lighting Display). If a lighting display is to be incorporated into the presentation to be delivered, the digital file, defining the specific details of the lighting display, is transferred from the hard disk storage unit 16 into the RAM of the computer 17, 294 (Load Light Script). The digital script is then transferred to a DMX lighting controller 33, which is a computer processing unit specifically designed to control lighting displays 295 (Send to Controller). The DMX lighting controller 33 then sends signals to the external lighting devices 34 pursuant to the script instructions, during the presentation of the multimedia content.

The multimedia delivery system determines whether promotional graphics are to be presented to the user of the system 285 (Promo Graphics). If promotional graphics are to be presented, the system transfers the graphic parameters from the database stored on the hard disk storage unit 16 into the RAM of the computer 17, 296 (Load Graphic Parameters). For example, such graphic parameters could include the location and timing of the graphics to be presented. The graphics are then transferred to the video display 11 where the graphics can be presented to the user at the designated time during the presentation 297 (Send to Display).

The system evaluates whether the user has requested to interact with the system 286 (Interaction Request). If the user has requested to interact with the system, the interaction process, as illustrated in FIG. 3d, takes place 280 (Interaction Process). If the user has not requested to interact with the system, the system evaluates whether printed output is appropriate 287 (Printed Output). If printed output is appropriate, such output is printed on the printer 12 connected to the computer 17; 298 (Print). If printed output is not appropriate, the content process ends 299 (End).

FIG. 3d illustrates the interaction between the user and the multimedia delivery system. If the user has interacted with the system but has not requested a particular multimedia content to be presented, the system determines whether the interaction requires that additional content be presented through the system 300 (Additional Content). If additional content is to be displayed, such content is presented to the user either through the graphical user interface or through the external devices 301 (Display Content). The system then requests that the user enter user-specific information into the system 302 (Display Template). Advertisers can later use such information to evaluate and analyze relevant markets. The system stores the information obtained from the user 303 (Store Input) and can, at predetermined intervals or upon request, transmit such information through the modem 27 to the central server 35 as illustrated in FIG. 1b.

The system determines whether the user interaction requires the system to present the user with a "hard copy" printed output 304 (Printed Output). If a printed output is required, the system delivers the printed output through the printer 12; 305 (Print Promo). If no printed material is associated with the user interaction, the system determines whether a purchase is involved in the user interaction 306 (Purchase). If no purchase is involved, the interaction process ends.

A user may be able to make financial transactions through the system using various payment methods such as a cash transaction, using the currency validator 14, or the or credit/debit card transactions using the card reader 13. If the interaction request involves a financial transaction, the system determines whether the financial transaction is being performed by credit card 307 (Credit Card) or by Cash 308 (Cash). Each credit card transaction is verified by conventional means already in place for such transactions. If the user is financing the transaction through a credit card, the transaction is verified through a financial validating service. As described above, the system may communicate with a financial validating service, through the modem 27, to validate a user's credit card 309 (Verify Card). Once the credit card transaction is verified, the account is credited 310 (Credit Account). If the user is financing the transaction through cash, the currency validator 14 accepts the cash, the information concerning the amount of cash is transferred to the computer 17, and the account is credited 310 (Credit Account).

Under either method of financing the transaction, a receipt may be printed on the printer 12 and presented to the consumer directly as described above. Products and services may be ordered using this method. Alternatively, such transactions can supply the user with the goods, coupons, or services directly, such as providing the user with a redemption coupon or an entertainment multimedia track that is available on the system.

I claim:

1. An improved multimedia delivery system, comprising:
   a computer which processes multimedia content:
   a storage device for storing multimedia content connected to said computer;
   a user interface means for receiving user input connected to said computer;
   a means for evaluating and analyzing said user input for advertising and marketing purposes, thereby generating a demographic profile of said user input;
   one or more converter means connected to said computer for converting said multimedia content transferred from said storage device to said one or more converter means from digital to analog format, each said converter means capable of simultaneously presenting multiple streams of multimedia content in analog format; and
   a presentation means, capable of presenting said multimedia content in analog format to a user.

2. The improved multimedia delivery system of claim 1, wherein said user interface means comprises a selection means for allowing a user to select one or more selections of multimedia content.

3. The improved multimedia delivery system of claim 1, wherein said user interface means comprises a touch sensitive video display.

4. The improved multimedia delivery system of claim 1, wherein said multimedia content comprises audio content, video content, and graphic content.

5. The improved multimedia delivery system of claim 1, further including a means for adding additional multimedia content to said storage device and a means for removing multimedia content from said storage device.

6. The improved multimedia delivery system of claim 5, wherein said means for adding additional multimedia content to said storage device comprises a satellite receiving station connected to said computer, capable of receiving digital data representing said additional multimedia content and transferring said additional multimedia content to said storage device.

7. The improved multimedia delivery system of claim 5, wherein said means for adding additional multimedia content is an optical drive connected to said computer, capable of transferring said additional multimedia content to said storage device.

8. The improved multimedia delivery system of claim 1, further including at least one RF modulator means connected to at least one of said converter means for converting said multimedia content in analog format into RF modulated outputs at different predetermined frequencies.

9. The improved multimedia delivery system of claim 8, further including a means for combining at least two RF modulated outputs into a single RF cable.

10. The improved multimedia delivery system of claim 1, further comprising an infra-red transceiver connected to said computer, said transceiver capable of emitting infrared signals to control said presentation means.

11. The improved multimedia delivery system of claim 1, further comprising at least one remote terminal, said remote terminal comprising a remote computer, a remote video display, and a remote presentation means, said remote computer connected to said connected to said computer such that information can be transferred between said computer and said remote computer, said remote presentation means connected to at least one of said plurality of converters such that said converters can transfer at least one stream of multimedia content to said remote presentation means.

12. The improved multimedia delivery system of claim 1, further comprising:
   a central data collection system; and
   a communication means for communicating said computer with said central data collection system.

13. The improved multimedia delivery system of claim 12, wherein said communication means consists of a modem connected to said computer, wherein said modem transfers said user input gathered from users of said multimedia delivery system to said data collection system.

14. An improved multimedia deliver system comprising:
   a computer which process multimedia content;
   a storage device for storing multimedia content connected to said computer;
   a user interface means, connected to said computer, for receiving user information;
   a plurality of decompression means for decompressing compressed multimedia digital data, connected to said computer;
   a plurality of converter means, connected to said decompression means, for converting decompressed multimedia content transferred from the storage device from digital multimedia content into analog multimedia content and capable of simultaneously delivering multiple streams of multimedia content;
   a plurality of RF modulators connected to said converter means for converting said multimedia content in analog format into RF modulated outputs at different predetermined frequencies;
   a means for combining said RF modulated outputs into a single RF cable connected to said RF modulator means;
   a printer connected to said computer;
   a card reader connected to said computer;
   a currency validator connected to said computer;
   an infrared transceiver connected to said computer;
   a modem connected to said computer; and
   a presentation means for presenting said multimedia content in analog format to a user.

15. A method for simultaneously providing multiple streams of multimedia content from a multimedia delivery system to a user or group of users, the method comprising the steps of:
   a. storing database signals representative of the multimedia content to be delivered in digital format;

b. selecting the multimedia content to be delivered;
c. transferring the unprocessed digital signals representing the selection of the multimedia content to be delivered to a plurality of converters;
d. converting the unprocessed digital signals into a series of processed analog signals capable of being simultaneously transferred to presentation devices;
e. presenting the analog signals to a user of the system through presentation devices;
f. evaluating and analyzing the selection of the multimedia content to be delivered for advertising and marketing purposes; and
g. generating a demographic profile.

16. The improved multimedia delivery system of claim 1, wherein said presentation means comprises one or more pieces of external equipment selected from the group consisting of video monitors, television monitors, aesthetic lighting displays, audio amplifiers, and speakers.

17. The improved multimedia delivery system of claim 1, further comprising a means for delivering physical output to a user of the multimedia delivery system.

18. The improved multimedia delivery system of claim 17, wherein said physical output is selected from the group consisting of advertisements, promotional materials, and coupons.

19. The improved multimedia delivery system of claim 18, wherein said physical output contains a watermark or bar code for identification and verification purposes.

20. The improved multimedia delivery system of claim 17, wherein said physical output is dynamically generated.

21. The improved multimedia delivery system of claim 1, further comprising a means for purchasing products.

22. The improved multimedia delivery system of claim 21, wherein said means for purchasing comprises:
a means for displaying one or more products;
a means for receiving payment for a selected product; and
a means for providing a recepit for said payment for said selected product.

23. The improved multimedia delivery system of claim 22, wherein said means for receiving payment is a card reader capable of secure credit and debit card transactions.

24. The improved multimedia delivery system of claim 22, wherein said means for receiving payment is a currency validator allowing cash transactions.

25. A multimedia delivery system, comprising:
a computer which processes multimedia content:
a storage device for storing multimedia content connected to said computer;
a user interface means for receiving user input connected to said computer;
a means for purchasing products;
one or more converter means connected to said computer for converting said multimedia content transferred from said storage device to said one or more converter means from digital to analog format, each said converter means capable of simultaneously presenting multiple streams of multimedia content in analog format; and
a presentation means, capable of presenting said multimedia content analog format to a user.

26. The multimedia delivery system of claim 25, further comprising a means for delivering physical output to a user of the multimedia delivery system.

27. The multimedia delivery system of claim 26, wherein said physical output is selected from the group consisting of advertisements, promotional materials, and coupons.

28. The multimedia delivery system of claim 26, wherein said physical output contains a watermark or bar code for identification and verifications purposes.

29. The multimedia delivery system of claim 26, wherein said physical output is dynamically generated.

30. The multimedia delivery system of claim 25, wherein said means for purchasing comprises:
a means for displaying one or more products;
a means for receiving payment for a selected product; and
a means for providing a receipt for said payment for said selected product.

31. The improved multimedia delivery system of claim 30, wherein said means for receiving payment is a card reader capable of secure credit and debit card transactions.

32. The multimedia delivery system of claim 30, wherein said means for receiving payment is a currency validator allowing cash transactions.

33. The multimedia delivery system of claim 25, wherein said presentation means comprises one or more pieces of external equipment selected from the group consisting of video monitors, television monitors, aesthetic lighting displays, audio amplifiers, and speakers.

34. A multimedia delivery system, comprising:
a computer which processes multimedia content:
a storage device for storing multimedia content connected to said computer;
a user interface means for receiving user input connected to said computer;
a means for delivering physical output to a user of the multimedia delivery system;
one or more converter means connected to said computer for converting said multimedia content transferred from said storage device to said one or more converter means from digital to analog format, each said converter means capable of simultaneousley presenting multiple streams of multimedia content in analog format; and
a presentation means, capable of presenting said multimedia content in analog format to a user.

35. The improved multimedia delivery system of claim 34, wherein said presentation means comprises one or more pieces of external equipment selected from the group consisting of video monitors, television monitors, aesthetic lighting displays, audio amplifiers, and speakers.

36. The multimedia delivery system of claim 34, wherein said physical output is selected from the group consisting of advertisements, promotional materials, and coupons.

37. The multimedia delivery system of claim 34, wherein said physical output contains a watermark or bar code for identification and verification purposes.

38. The multimedia delivery system of claim 34, wherein said physical output is dynamically generated.

39. The method of claim 15, further comprising the step of:
h. delivering physical output to the user of the multimedia delivery system.

40. The method of claim 15, further comprising the step of:
h. purchasing a product through the multimedia delivery system.

* * * * *